Feb. 9, 1926. 1,572,145
C. L. JOHNSON
MEANS FOR LOCKING A TRANSMISSION HOUSING COVER
Filed July 13, 1922 3 Sheets-Sheet 1
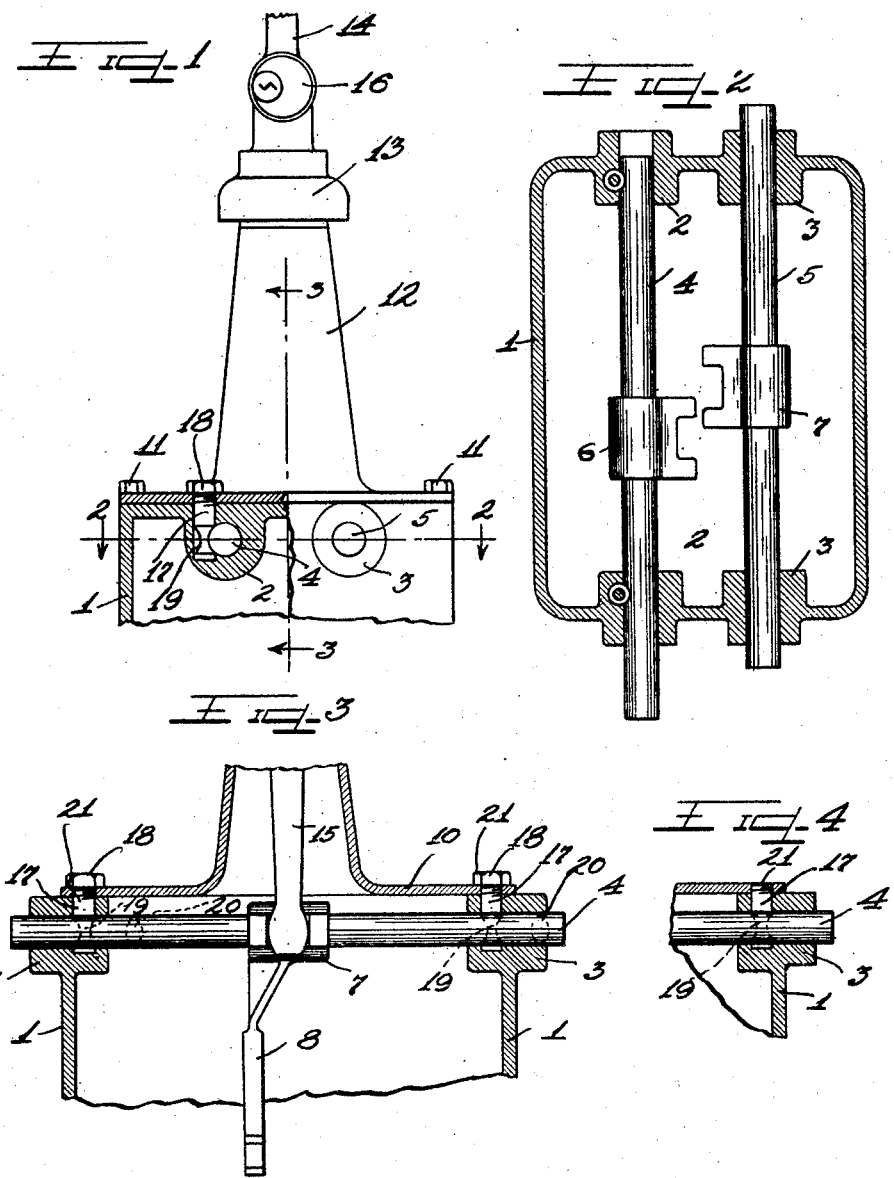
Inventor
COLVIN L. JOHNSON

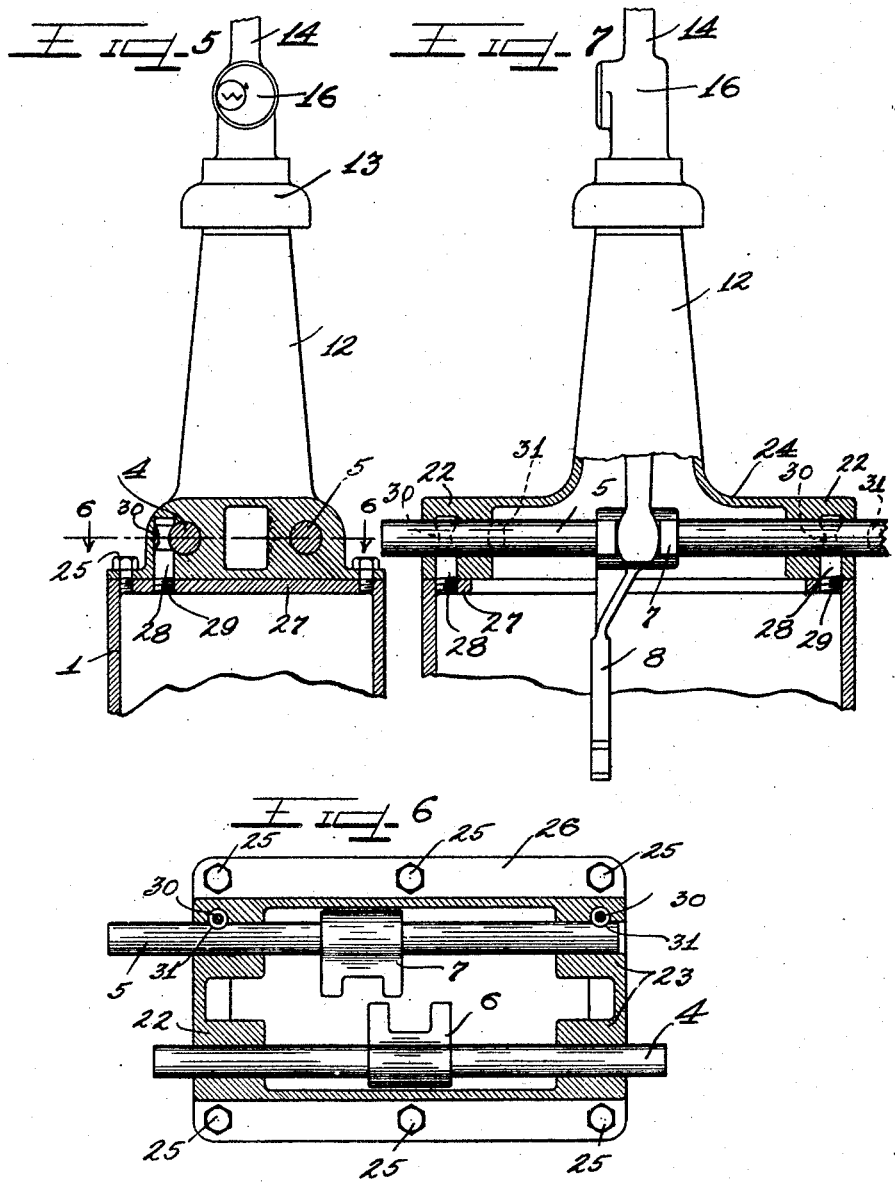

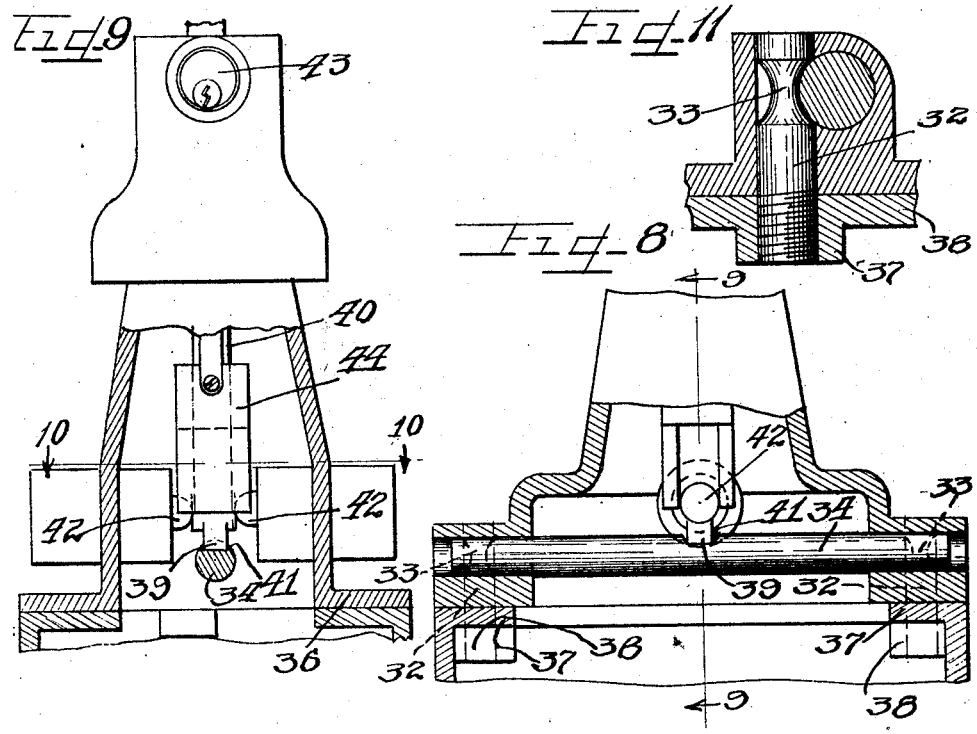

Patented Feb. 9, 1926.

1,572,145

UNITED STATES PATENT OFFICE.

COLVIN L. JOHNSON, OF ST. LOUIS, MISSOURI, ASSIGNOR TO JOHNSON AUTOMOBILE LOCK CO., A CORPORATION OF ILLINOIS.

MEANS FOR LOCKING A TRANSMISSION-HOUSING COVER.

Application filed July 13, 1922. Serial No. 574,651.

*To all whom it may concern:*

Be it known that I, COLVIN L. JOHNSON, a citizen of the United States, and a resident of the city of St. Louis, in the State of Missouri, have invented certain new and useful Improvements in a Means for Locking a Transmission-Housing Cover; and I do hereby declare that the following is a full, clear, and exact description of the same, reference being had to the accompanying drawings, and to the numerals of reference marked thereon, which form a part of this specification.

This invention relates to means for locking a transmission housing cover and particularly to means which are adapted to prevent the removal of the cover from the transmission housing when the transmission gears are in a predetermined position.

In order to prevent the theft or unauthorized use of motor vehicles and other gear operated mechanisms, it is customary in many cases to lock the transmission gears thereof in a neutral or inoperative position by locking means which are associated with the gear shift lever or other shifting device. While such locking means are highly successful in attaining their desired purpose, it is nevertheless possible in certain cases to remove the transmission housing cover and the gear locking means, after which the gears may be shifted into operative position and the vehicle or other mechanism operated.

It is an object therefore of the present invention to provide means for locking a removable portion of the transmission housing to the housing while the transmission gears are in a predetermined relative position.

It is also an object of this invention to provide means adapted to engage the slidable gear shifting rods of a transmission housing to prevent removal of the removable portion of the housing except when said rods are moved into a predetermined position.

It is another object of this invention to provide cover locking means associated with a gear shifting rod supplementary means preventing the removal of the shifting rod.

It is an important object of this invention to provide locking means of the class described which do not interfere with the normal operation of the transmission gears and associated mechanisms.

Other and further important objects of this invention will be apparent from the disclosures in the specification and the accompanying drawings.

The invention (in a preferred form) is shown on the drawings and hereinafter more fully described.

On the drawings:

Figure 1 is a fragmentary elevation of a transmission housing showing the gear shifting means and showing the locking means for the housing cover in section.

Figure 2 is an enlarged section on the line 2—2 of Figure 1.

Figure 3 is an enlarged fragmentary section on the line 3—3 of Figure 1.

Figure 4 is an enlarged detail section showing one of the locking devices for the housing cover.

Figure 5 is a fragmentary elevation showing the gear shifting means with a portion of the transmission housing and the locking means therefor in section according to a modified embodiment of the present invention.

Figure 6 is a section on the line 6—6 of Figure 5.

Figure 7 is an enlarged fragmentary section with parts in elevation showing the mechanisms in locked position.

Figure 8 is a fragmentary sectional view with parts in elevation illustrating a slightly modified form of locking means.

Figure 9 is a fragmentary section with parts in elevation on the line 9—9 of Figure 8.

Figure 10 is a section on the line 10—10 of Figure 9 with parts omitted.

Figure 11 is an enlarged fragmentary detail section on the line 11—11 of Figure 10.

As shown on the drawings:

The reference numeral 1 indicates a transmission housing or casing which incloses suitable change speed transmission gears (not shown) which may be shifted to various positions to control a mechanism operated thereby. Slidably engaged through apertured portions 2 and 3 formed at the end of said housing 1 are gear shift rods 4 and 5 which have inwardly facing notched blocks 6 and 7 mounted thereon, said blocks 6 and 7 having usual gear shifting forks 8 integral therewith and depending therefrom into the housing 1. The top of the housing or casing 1 is closed by a cover 10 which is secured thereon in the usual manner by means of machine screws 11, and integral with said cover and extending upwardly from the central portion thereof is a dome portion 12 which affords at 13 a universal support for a gear shift lever 14 having a depending portion 15 extending downwardly through the dome-shaped portion 12 and adapted to engage in the notches formed in the blocks 6 and 7 whereby said lever may be moved to selectively reciprocate the rods 4 and 5 and consequently the gear shifting forks 8 to shift the gears into desired relative position.

A suitable locking mechanism, which is designated by the reference numeral 16, is provided to lock the lever 14 in a neutral position, that is in such a position that the notches in the blocks 6 and 7 are directly opposite each other.

Means which are provided for locking the cover 10 on the housing when said rods 4 and 5 are in such neutral position will now be described. Said means comprise pins 17 which are engaged through apertures in the cover 10 and which are provided with integral ends 18 engaging the upper side of said cover. Said pins 17 extend downwardly into recesses formed in the bosses 2 and are provided at their lower ends with cutaway portions as indicated at 19, which engage the rod 4 permitting of the sliding movement thereof but preventing the upward movement of said pins 17 and consequently preventing removal of the cover 10. In order, however, that said cover 10 may be removed when the rod 4 is shifted to a predetermined position, ordinarily a position where the gears are in operative relation, said rod 4 is provided with notches 20 which are adapted to register with said cutaway portions 18 when the rod is shifted to such position and consequently permit upward movement of the pins relative to the rod and the removal of the cover 10. The pins 17 are preferably threaded at 21 to engage with threads formed in the apertures in the cover 10, thereby preventing loss of the pins when the cover is removed, and, as indicated in Figure 4, the heads 18 on said pins may be omitted if desired, said threads 21 sufficing to prevent relative movement of the cover 10 and the pins.

In the embodiment of this invention illustrated in Figures 5 to 7 inclusive, the rods 4 and 5 are slidably mounted in bosses 22 and 23 formed at the ends of the cover portion 24 which is secured to the housing 1 by means of machine screws 25 engaged through flanges 26 formed on said cover portion and through threaded apertures formed in inwardly extending flanges 27 on the upper side of the housing or casing 1. In this embodiment of the invention the gear shift lever and associated mechanisms of the type previously described and similar parts comprising the same are designated by like reference numerals. Pins 28 similar to the pins 17 are provided for locking the cover 24 against removal when the rod 4 is in such a position that the gears are in neutral or inoperative position. Said pins 28 are threaded at 29 and engaged in threaded apertures in the flange 27, and are cut away at 30 to provide cutaway portions similar to the cutaway portions 19 which slidably engage the rod 4, thereby preventing upward movement of said rod 4 and of the cover 24 except when said rod is shifted into such position that notches 31 therein register with said cutaway portion, thus permitting the upward movement of said rod and the removal of the cover.

Figures 8 to 11 inclusive illustrate an application of this invention to a modified type of gear shift mechanisms wherein screws or pins 32 having cutaway portions 33 engaging a slidably mounted guide rod 34 are engaged through bosses 35 in a cover 36 and are threaded in apertures in bosses 37 formed in flanges 38 in the transmission housing. This engagement of the cutaway portions 33 with the rod 34 of course prevents removal of the pins and of the cover 36 and means are provided to prevent the sliding of the rod 34 in such a manner as to release the pins 32 when the gear mechanism is locked in neutral position. Said means comprise an extension 39 which is formed on the lower end of the gear shift lever, which is of usual construction and indicated in general by the reference numeral 40. The extension 39 is adapted to be moved into a notch 41 in the rod 34 when the lever is moved laterally into neutral position and consequently prevents longitudinal movement of said rod 34 when the lever is in such position. The lever is normally retained in neutral position by usual retaining means 42, and locked in such position by a suitable lever locking mechanism 43—44.

It will accordingly be observed that this invention provides means whereby the cover portion is locked on the transmission or casing at all times except when the gears in said housing or casing are shifted into a predetermined position. It is therefore apparent that when the locking means of this invention are used in conjunction with locking means which are adapted to lock the gear shifting means out of such predetermined position, unauthorized removal of the housing or casing cover and access to the gears is prevented. The cover-locking means of this invention may be used in connection with a variety of types of transmissions and of locking means therefor and interferes in no way with the operation thereof.

I am aware that numerous details of construction may be varied through a wide range without departing from the principles of this invention, and I therefore do not purpose limiting the patent granted hereon otherwise than necessitated by the prior art.

I claim as my invention:

1. The combination with a casing, of gears mounted therein, means for shifting said gears, slidably mounted rods supporting said shifting means, a removable cover on the casing permitting access to the gears when removed, removable means for permitting the removal of said cover when said means are removed, retaining means concealed in said cover and engaging the slidable rods for preventing removal of the cover except when said rods are shifted to a predetermined position even when said removable means are removed.

2. The combination with a casing, of gears mounted therein, slidably mounted means for shifting said gears, a removable cover on the casing permitting access to the gears therein when removed, removable means on said cover permitting the removal of said cover when said means are removed, means concealed in said cover engaging said slidably mounted means for preventing the removal of the cover even when said removable means are removed except when said shifting means are shifted to a predetermined position.

In testimony whereof I have hereunto subscribed my name.

COLVIN L. JOHNSON.